United States Patent [19]

Desaulniers et al.

[11] Patent Number: 5,624,513

[45] Date of Patent: Apr. 29, 1997

[54] REMOVAL OF INSERTS FROM THE INTERIORS OF TURBINE AIRFOILS

[75] Inventors: David Desaulniers, New London; Ramon Velez, Jr., South Meriden, both of Conn.

[73] Assignee: United Technologies Corporation, Hartford, Conn.

[21] Appl. No.: 490,187

[22] Filed: Jun. 14, 1995

[51] Int. Cl.$^6$ ..................................................... B32B 35/00
[52] U.S. Cl. ........................... 156/98; 156/247; 156/344; 264/36; 29/402.03; 29/402.08; 29/426.3
[58] Field of Search ........................... 156/94, 98, 247, 156/344, 584; 264/36; 29/402.03, 402.08, 426.3

[56] References Cited

U.S. PATENT DOCUMENTS

| | | | |
|---|---|---|---|
| 2,684,526 | 7/1954 | Hoover | 29/402.03 X |
| 2,842,801 | 7/1958 | Walkey et al. | 156/94 X |
| 3,487,733 | 1/1970 | Townsend | 29/402.03 X |
| 5,106,440 | 4/1992 | Tangeman | 156/94 |
| 5,330,690 | 7/1994 | Eitel | 156/98 X |
| 5,368,792 | 11/1994 | Short et al. | 156/98 X |

*Primary Examiner*—Mark A. Osele

[57] ABSTRACT

An insert 115 is removed without damage from an airfoil 45 by at least partially filling the insert with an adhesive 140 having a haft 145 embedded therein. The insert is extracted from the airfoil by gripping the haft and pulling.

10 Claims, 2 Drawing Sheets

REMOVAL OF INSERTS FROM THE INTERIORS OF TURBINE AIRFOILS

TECHNICAL FIELD

This invention relates generally to turbine engines, and particularly to a method useful in the overhaul and repair of airfoils employed in such engines.

BACKGROUND OF THE INVENTION

A gas turbine engine is typical of turbine machines in which the concepts described herein may be advantageously employed. In a gas turbine engine such as the type employed in powering aircraft, pressurized air and fuel are burned in a combustion chamber to add thermal energy to flowing through the engine. The effluent from the combustion chamber comprises high temperature products of combustion which are flowed downstream in an annular flow path through the turbine section of the engine. Nozzle guide vanes at the inlet to the turbine direct the effluent onto a multiplicity of rotor blades which extend radially outward from the engine rotor. The nozzle guide vanes and rotor blades are particularly susceptible to thermal damage and are commonly cooled by air from the engine's compressor, which is bled through suitable conduits in the engine for subsequent distribution to the rotor blades and guide vanes.

A common method of cooling turbine blades and vanes utilizes impingement tubes or baffles disposed within the turbine blade or vane. The baffles extend through the airfoil portion of the turbine vane and is in fluid communication with the source of cooling fluid. The baffles are perforated with a plurality of impingement holes spaced about through which the cooling fluid passes. The cooling fluid exiting the baffle impinges upon the internal surfaces of the airfoil. The arrangement of impingement holes distributes the cooling fluid within the airfoil to prevent a deficiency in cooling from occurring in a particular location.

The thermal damage to which the turbine airfoils are susceptible, manifests itself in cracking and geometric distortion (twisting) of those components as well as breakdown (chipping) of the thermal barrier coatings thereon. Accordingly, throughout the life span of a gas turbine engine, these components must be periodically removed from the engine and overhauled. As part of such overhaul, the cooling baffles are removed prior to any repair and/or recoating of the interior airfoil surfaces. The baffles are removed typically, by tapping the baffle with a punch or the like from one end thereof, thereby dislodging the baffle and sliding the baffle out of the airfoil through the opposite end thereof. Another known practice of the baffle removal involves gripping an edge of the baffle with pliers or a similar gripping device and pulling the baffle out through one end of the airfoil. In either case, the baffle is frequently damaged beyond repair. Indeed, in modern gas turbine aircraft engines, baffle scrap rates of 20%–100% are not uncommon. Inasmuch as the price of such baffles ranges from approximately $45.00 to approximately $400.00 each, such scrap rates add significantly to the cost of the overhaul and repair of these components and thus, the operation of the engines in which they are employed.

SUMMARY OF THE INVENTION

Accordingly, it is a principal object of the present invention to provide an improved method for removal of baffles and other inserts from gas turbine engine airfoils, wherein the scrap rate of such components is significantly reduced.

In accordance with the present invention, baffles are removed neither by punching, tapping, or gripping, but rather by drawing the baffle out of the airfoil by means of a core formed within the baffle by filling at least a portion of the baffle with an adhesive such as a hot melt adhesive. In the preferred embodiment, before the adhesive cures, a haft is embedded in the adhesive to provide a surface which may be gripped with pliers or the like to draw out the combination of the baffle and core from the airfoil without requiring the baffle itself to be impacted or gripped and thus damaged by punches, pliers or the like. Once the baffle is removed, it may be reused merely by removal of the adhesive by any suitable method as will be determined by the type of adhesive used. Where a hot melt adhesive is employed, the adhesive is removed by baking in an oven at a temperature higher than the melt temperature of adhesive. The baffle is then cooled, cleaned and reused.

With the method of the present invention, the scrap rates of 20–100% are effectively reduced to approximately 0% thereby enhancing the economies which the airfoils and the engines in which they are employed, are overhauled and maintained.

BEST MODE FOR CARRYING OUT THE INVENTION

Figure 1:
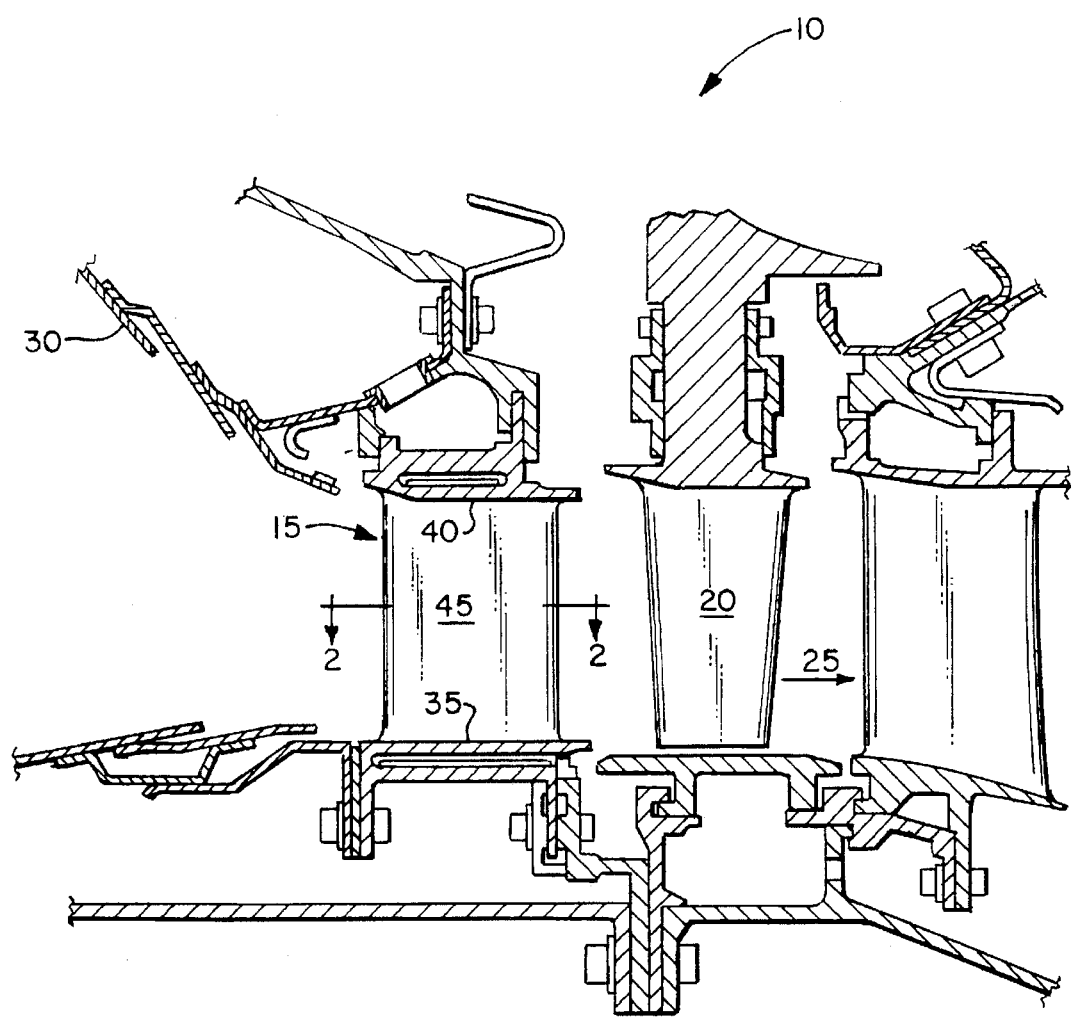
FIG. 1 is a sectioned elevation of combustion and turbine sections of a gas turbine aircraft engine.

Referring to FIG. 1, a portion of the turbine section of a gas turbine engine 10 is shown in cross section. A nozzle guide vane 15 and turbine blade 20 are disposed within an annular flow path 25 of combustion gases discharged from a combustion chamber 30. The nozzle guide vane is one of a row of vanes which are located at the same axial position within the annular flow path. Similarly, the turbine blade is one of a row of turbine blades disposed within the flow path immediately downstream of the vanes. Each guide vane has an outer diameter base 35 and an inner diameter base 40 which support an airfoil section 45 extending between the outer and inner bases.

Figure 2:
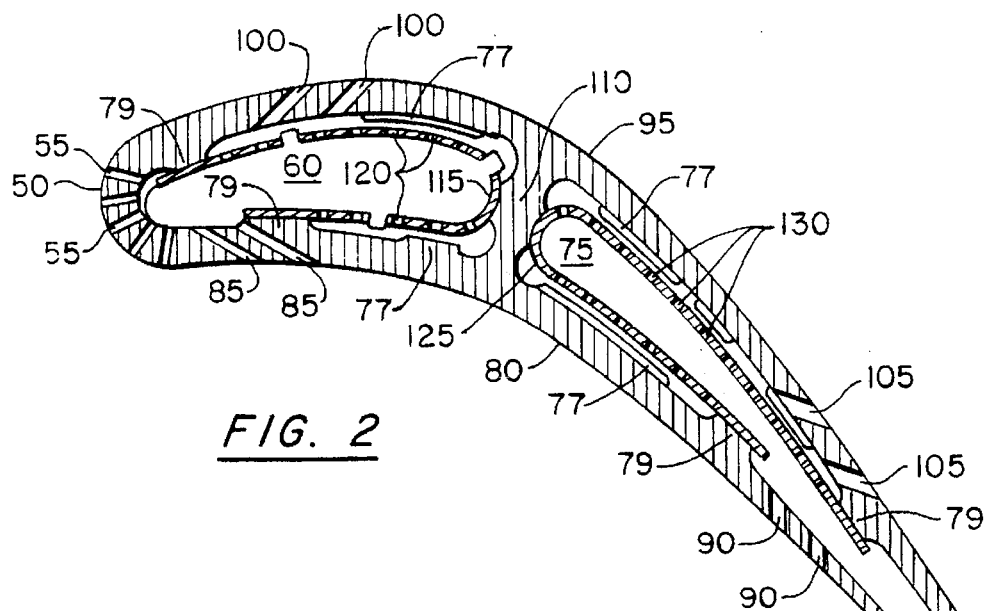
FIG. 2 is a sectional view taken in the direction of line 2—2 of FIG. 1.

Referring to FIG. 2, each airfoil section includes a leading edge 50 facing in the upstream direction and including therein leading edge cooling holes 55 disposed between the inner and outer bases. The leading edge cooling holes connect internal leading edge cavity 60 with the annular flow path 25. The airfoil section also has a trailing edge 65 including a number of cooling holes, one of which is shown at 70. Cooling holes 70 are disposed in a row along the trailing edge between the inner and outer bases. The trailing edge cooling holes connect an integral trailing edge cavity 75 with the annular flow path 25. The leading and trailing edge cavities are each provided with various standoffs 77 and sealing ribs 79. In addition to the leading and trailing edges, each airfoil section is defined by a pressure surface 80 which includes a plurality of pressure surface cooling holes 85 which provide communication between leading cavity 60 and annular flow path 25. Other pressure surface cooling holes 90 provide communication between trailing edge cavity 75 and flow path 25. Each airfoil also includes a suction surface 95 with suction cooling holes 100 providing communication between leading edge cavity 60 and flow path 25 as well as cooling holes 105 providing communication between the trailing edge cavity 75 and annular flow path 25.

Cross member 110 separates the leading and trailing edge cavities. The leading edge cavity accommodates an insert or baffle 115 which is generally U-shaped in cross section and positioned within (spaced from) the interior walls of leading edge cavity 60 by sealing ribs 77 and standoffs 79. Baffle 115 is provided with a multiplicity of perforations 120 across its surface between the inner and outer bases. Trailing edge cavity 75 accommodates insert or baffle 125 having perforations 130 therein and positioned within cavity 75 by standoffs 79 or sealing ribs 77.

It will be recognized that turbine section 10 in general, and guide vane 45 in particular are essentially similar to those disclosed in U.S. Pat. No. 4,153,386 assigned to the assignee of the present invention. As set forth in the detail in that patent, during operation of the engine, air bled from the compressor section (not shown) of the engine is supplied to leading and trailing edge cavities 60 and 75. Some of this air flows through the various cooling holes to provide film cooling of the exterior surfaces of the vane. Baffles 115 and 125 distribute cooling air through the holes therein to the interior wall of the airfoil section thereby cooling those walls by impingement cooling which effectively supplements the film cooling mentioned hereinabove. Further details of this cooling scheme are set forth in U.S. Pat. No. 4,153,386 noted hereinabove.

Those skilled in the art will appreciate that typically, in modern gas turbine aircraft engines, turbine vanes and blades such as illustrated herein, are exposed to products of combustion from combustor 18, at temperatures as high as 3000 degrees Fahrenheit. Such an extreme thermal environment, over time, can distort the airfoil sections, cause cracking therein, and a deterioration of thermal barrier coatings thereon. Accordingly, from time to time, during engine maintenance procedures, the vanes must be removed and overhauled.

Prior to reworking of the airfoils by repairing any cracking or twisting thereof or reapplying thermal barrier coatings thereto, it is necessary that the baffles be removed. As set forth hereinabove, prior art techniques for removing the baffles comprised either pushing the baffle radially through the vane subsequent to the bases or covers having been removed, by tapping the baffle out with a punch or similar impact device, or, pulling the baffle out by grasping an end of the baffle by pliers or the like. As further set forth hereinabove, such techniques in many instances cause irreparable damage to the baffles.

Figure 3:
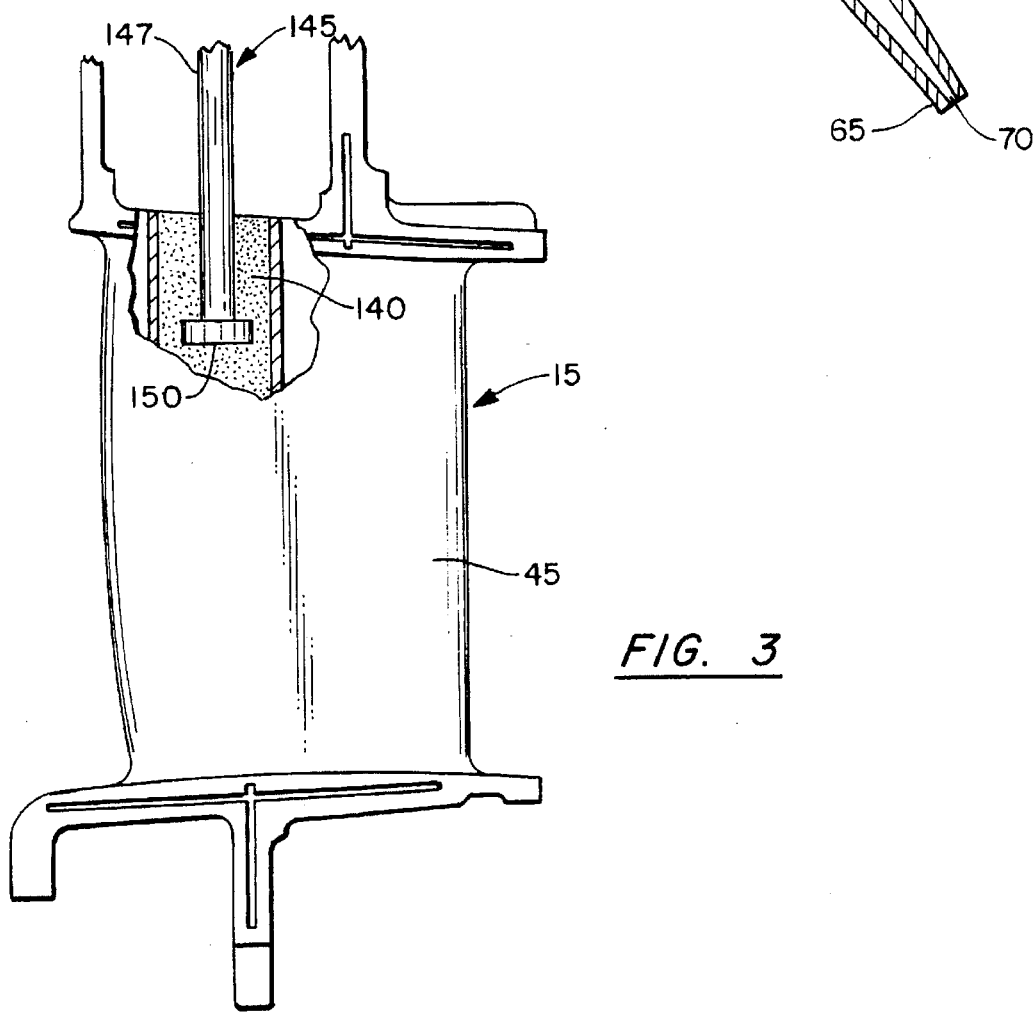
FIG. 3 is an enlarged elevation, partially sectioned and broken away, of a turbine inlet stator vane of the type shown in FIG. 1.

Referring to FIG. 3, vane 45 is shown with any covers of the airfoil thereof removed, exposing the interior of the leading edge baffle. In accordance with the present invention, the leading edge baffle is extracted by first removing any weld from the ends of the baffle, which weld fixes the baffle to the vane. Next, an adhesive 140 is flowed into the baffle, preferably adjacent the cusp thereof. Such as a hot melt adhesive sold by Arrow under the trademark Glue Stix™. This adhesive melts at a temperature of approximately 400 degrees Fahrenheit and is applied by any of various well know heated applicators (not shown).

Prior to the curing of the adhesive which occurs gradually as the adhesive cools, a haft 145 is embedded in the adhesive so that a portion thereof extends radially outwardly therefrom. In the preferred embodiment, the haft comprises a fastener such as a screw or nail with a shank 147 and an integral head 150, providing an extended surface to which the adhesive bonds and a broad surface over which a pulling force applied to the haft is transferred to the adhesive.

Once the adhesive is cured, and haft 145 securely embedded therein, the baffle which is held in place by an interference fit between itself and standoffs and sealing ribs, is withdrawn from the vane by grasping haft 145 with pliers or similar gripping device and pulling outwardly. This withdraws the bonded combination of the baffle, the haft, and the adhesive from the interior of the airfoil. This bonded combination is then heated in any suitable oven or chamber to a temperature beyond the melting point of the adhesive whereupon the adhesive melts and flows out of the baffle severing the bond between the baffle and the haft. The baffle may then be cleaned if necessary and reused.

From the foregoing, it is readily understood how the present invention overcomes the difficulties associated with the removal of baffles by prior art techniques of tapping the baffles out with a punch or the like or pulling directly on the baffles with pliers or similar gripping devices. The adhesive bonds securely to the baffle, flowing into the perforations to provide a firm bond to the baffle. The head on the haft also provides an enhanced surface area for firm bonding and a wide area over which a pulling force on the haft may be applied to the adhesive and the baffle. In withdrawing the baffle, since the haft rather than the baffle itself is gripped, no damage to the baffle occurs during its removal from the vane and scrap rates, as high in the prior art as 100 percent in some prior art cases are effectively reduced to 0, thereby profoundly reducing the expense associated with the overhaul of such turbine vanes.

While a particular embodiment of the present invention has been shown and described, it will be appreciated that alternate embodiments of the present invention will also suggest themselves to those skilled in the art. Accordingly, while U-shaped baffles have been illustrated, it will be readily understood that the invention works equally well with tubular baffles or inserts. Indeed, the present invention enhances the removal of any type of insert which may be employed interiorly of an airfoil. While the invention has been described within the context of a first stage turbine vane, it will be readily appreciated that this invention is employable with equal utility to remove an insert from any airfoil (blade or vane) in the engine. Moreover, while a polyester hot melt adhesive has been set forth herein as have fasteners such as screws or nails, it will be appreciated that any of a multiplicity of other adhesives and hafts can be employed with equal utility. Accordingly, it is intended by the appended claims to cover these and any other embodiments which fall within the true spirit and scope of this invention.

What is claimed is:

1. A method of removing an insert from the interior of a hollow airfoil, said method being characterized by:

at least partially filling said component with an uncured adhesive;

curing said adhesive to form a bonded combination of said component and adhesive;

removing said insert by applying a force to said adhesive to extract said bonded combination of said component and said adhesive from said airfoil.

2. The method of claim 1 characterized by said insert being a baffle.

3. The method of claim 1 characterized by:

embedding a haft in said adhesive prior to the curing thereof to form a bounded combination of said insert, said adhesive and said haft; and said component being removed by engaging said haft, and applying said force to said haft, thereby extracting said insert of said component, adhesive and haft, from said airfoil.

4. The method of claim 3 characterized by said haft comprising a shank with an enlarged head on one end thereof.

5. The method of claim 4 characterized by said haft being embedded in said adhesive with said head therein.

6. The method of claim 4 characterized by said haft comprising a nail.

7. The method of claim 4 characterized by said haft comprising a screw.

8. The method of claim 1 characterized by said adhesive being a hot melt adhesive, curable by the cooling thereof from a heated and melted state.

9. The method of claim 8 characterized by said hot melt adhesive comprising a polyester.

10. The method of claim 8 characterized by the further steps of removing said adhesive from said component by re-melting said adhesive subsequent to the removal of said bonded combination of said adhesive and said component.

* * * * *